United States Patent [19]

Kondou

[11] Patent Number: 4,902,525
[45] Date of Patent: Feb. 20, 1990

[54] SWEETENER COMPOSITION

[75] Inventor: Tsutomu Kondou, Sagamihara, Japan

[73] Assignees: Mitsubishi Chemical Industries Limited; Nikken Chemicals Company, Limited, both of Japan

[21] Appl. No.: 180,480

[22] Filed: Apr. 12, 1988

[30] Foreign Application Priority Data

Apr. 14, 1987 [JP] Japan .................. 62-91599

[51] Int. Cl.⁴ .......................................... A23L 1/236
[52] U.S. Cl. ..................................... 426/548; 426/658
[58] Field of Search ................ 426/548, 658, 656, 657

[56] References Cited

U.S. PATENT DOCUMENTS

| | | | |
|---|---|---|---|
| 3,876,794 | 4/1975 | Rennhard | 426/548 |
| 4,254,155 | 3/1981 | Dwivedi et al. | 426/548 |
| 4,382,924 | 5/1983 | Berling et al. | 426/548 |

Primary Examiner—Marianne Cintins
Attorney, Agent, or Firm—Jordan B. Bierman

[57] ABSTRACT

A sweetener composition comprising mesoerythritol and various nonsugar sweetener(s) which are employed for modifying the taste of the mesoerythritol. The sweetener composition of the present invention, which exhibits a sweetness closely similar to that of sugar, is a low-caloric and non-nutritive product and available in sweetening, for example, various foods.

6 Claims, 3 Drawing Sheets

SWEETENER COMPOSITION

BACKGROUND OF THE INVENTION

1. Field of the Invention

This invention relates to a sweetener composition for modifying the taste of erythritol. More particularly, it relates to a composition comprising erythritol and various nonsugar sweetener(s).

2. Prior Art

It is known that nonsugar sweeteners such as stevioside, glycyrrhizin, aspartame, sodium cyclamate (cyclo), sacchatin, saccharin sodium and acesulfam K are approximately several hundreds times as sweet as sugar. Therefore these substances have been incorporated in, for example, foods and drugs as a sweetener.

Mesoerythritol is a sugar alcohol characterized by the following properties. Namely, this compound is present in the form of beautiful white crystals and has a molecular weight of 122, a melting point of 119° C. and a boiling point of 329° to 331° C. It is highly soluble in water, readily forms crystals and has non-digestive and noncaries properties. The sweetness of erythritol is somewhat lower than that of sugar but somewhat higher than that of glucose. A panel test suggested that the sweetness of erythritol might correspond to approximately 75 to 80% of that of sugar.

However mesoerythritol is inferior to sugar in qualities of its sweetness. It is generally believed that sugar has an ideal sweetness. In contrast thereto, the sweetness of mesoerythritol is somewhat unsatisfactory since it is accompanied by, for example, lusciousness, undesirable aftertaste or nondeliciousness.

On the other hand, nonsugar sweeteners such as stevioside, glycyrrhizin, aspartame or thaumatin each having a high sweetness should be added to a food generally at an extremely low ratio. Thus it is required to blend these sweeteners with excipients or thickeners such as reducing maltose, thick malt syrup or lactose to prepare, for example, a sweetener for table use. However these excipients and thickeners would be absorbed in vivo and thus supply energy, which is contrary to the purpose of the use of the nonsugar sweeteners.

Japanese Patent Publication No. 18180/81 (corresponding to U.S. Ser. No. 989015 and European Patent Publication No. 9325A) entitled "Erythritol-containing composition for preventing tooth decay" has disclosed examples wherein erythritol is blended with 0.075 to 4.4% by weight, based on the erythritol, of saccharin to thereby give a sweetener composition for toothpaste, foundant, fudge bar, marshmallow, diet ice cream, nonsugar chewing gum or low-caloric soda pop.

SUMMARY OF THE INVENTION

Under these circumstances, the present inventors have found that a composition obtained by blending erythritol with various nonsugar sweeteners shows a taste superior to the one obtained by using erythritol alone in various points without damaging the desirable taste of erythritol, thus completing the present invention.

Accordingly it is the primary object of the present invention to provide a composition wherein mesoerythritol is blended with various nonsugar sweeteners which are employed for modifying the sweetness of the erythritol, such as stevioside, thaumatin, aspartame or glycyrrhizin.

BRIEF DESCRIPTION OF DRAWINGS

In FIGS. 1 to 5, numbers ① to ⑥ define a smack, a lightness, an odorous, a bitterness, an aftertaste, an astringency, a palatability and a desirability respectively.

DETAILED DESCRIPTION OF THE INVENTION

Figure 1:
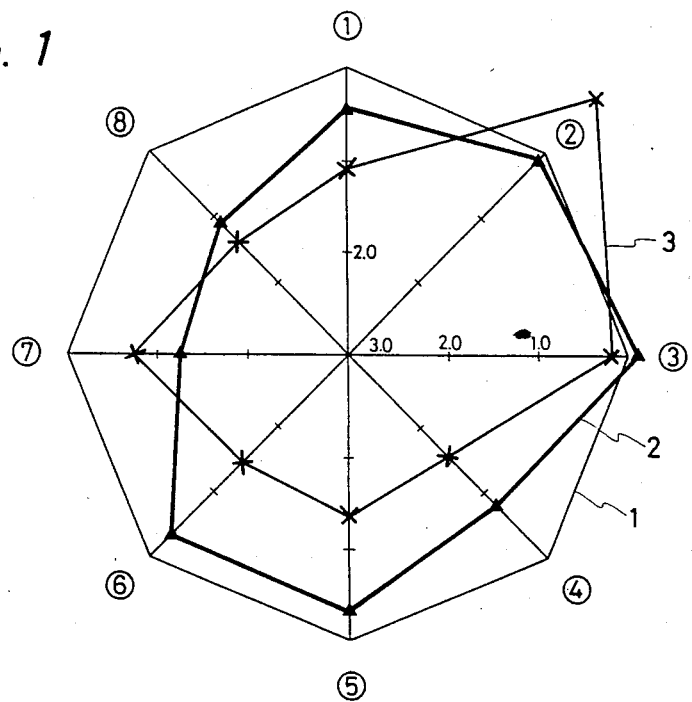
FIGS. 1 to 5 show the results of the organoleptic evaluation according to an Example of the present invention.

Examples of the nonsugar sweeteners to be used in the present invention include stevioside, glycyrrhizin, aspartame and thaumatin. Further any nonsugar sweetener may be employed so long as it agrees the object of the present invention.

Either one of these nonsugar sweeteners or a mixture thereof may be employed.

In the present invention, a sweetness closely similar to that of sugar, which is regarded as ideal, can be achieved by blending mesoerythritol with the above-mentioned nonsugar sweetener(s). The present invention is further advantageous in that the composition thus obtained is low-caloric since erythritol is a nondigestive sugar alcohol as described above.

The composition ratio, by weight, of the mesoerythritol and nonsugar sweeteners varies depending on the employed nonsugar sweetener(s). It is preferable to use, for example, 0.0006 to 0.004, part by weight of stevioside, 0.001 to 0.004 part by weight of glycyrrhizin, 0.001 to 0.014 part by weight of aspartame and 0.0004 to 0.001 part by weight of thaumatin per part by weight of erythritol. It is further preferable to use 0.0006 to 0.0024 part by weight of stevioside or 0.002 to 0.008 part by weight of aspartame per part by weight of erythritol.

The taste-modifier for mesoerythritol comprising nonsugar sweeteners of the present invention may be used in any form such as molded products, e.g., powder, granules, crystals or tablets, solution or molten mixture. The composition may further comprise some additives such as thickeners or excipients depending on the purpose. Examples of these additives include sugar alcohols such as maltitol, sorbitol and hydrogenated oligosaccharides, fructose, glucose, sucrose, lactose, maltose, fructo-oligosaccharides, isomerized sugars and thick malt syrup.

A sweetener composition whose taste is improved by the taste-modifier comprising nonsugar sweeteners for mesoerythritol may be employed either as such as a seasoner or as a sweetener for any foods to be sweetened. Examples of these foods include beverages such as coffee, black tea, cola, soda pop and fruit juice; dsserts and frozen desserts such as jelly, pudding, yogurt, ice cream and sherbet; dairy products such as cream, coffee whitener and milky drink; confectionery such as chocolate, chewing gum and "yokan" (sweet jelly of beans); baked foods such as bread and cake; and other food products such as pickled vegetables, "tsukudani" (small fish or seaweed boiled down with soy sauce) and ground fish meat products. In addition, a remarkable synergistic sweetening effect can be achieved by using mesoerythritol together with common salt. Thus a synergistic effect, similar to the one obtained by simultaneously using sugar and common salt, can be obtained by using the taste-modifier of the present invention together with a small amount of common salt.

To further illustrate the present invention in detail, and not by way of limitation, the following Examples will be given. Unless otherwise indicated, all parts, percents and ratios are by weight.

SWEETNESS

The term "sweetness" of a sweetener as used in following Example is a value which is determined on the basis of the sweetness of a 7% by weight aqueous solution of sucrose. This definition of sweeteners is used throughout the present specification and claims.

Namely the sweetnesses of various sweeteners as employed herein are as follows.

TABLE 1

| Sweetener | Sweetness | Tradename/Manufacturer |
|---|---|---|
| sucrose | 1.00 | Higashi Nippon Sugar Manufacturing Co., Ltd., granules |
| mesoerythritol | 0.67 | Nikken Chemicals Co., Ltd., powder |
| aspartame | 118.64 | Ajinomoto Co., Inc. |
| stevioside AX-P | 233.33 | Dainippon Ink Chemicals, Inc., Rebandioside AX-P |
| Stevioside α-G ⓟ | 92.11 | Toyo Sugar Refining Co., Ltd. |

TABLE 1-continued

| Sweetener | Sweetness | Tradename/Manufacturer |
|---|---|---|
| | | invert sugar |

EXAMPLE 1

The sweetness-qualities of each single sweetener as shown in Table 1 were organoleptically evaluated. Then those of combinations of mesoerythritol and other nonsugar sweeteners were similarly evaluated. Table 2 shows the results.

(i) Panelists: consisting of 11 female staff members of Osaka Joshigakuen Junior College.

(ii) Evaluation of sweetness-qualities of a single sweetener:

Eight items of the sweetness-qualities of each sweetener were evaluated in seven grades. A 7% by weight aqueous solution of sucrose was employed as a standard, i.e., regarded as 0 (see Table 2).

(iii) Evaluation of sweetness-qualities of a combination:

The sweetness qualities of each combination of mesoerythritol and another nonsugar sweetener as shown in Table 3 was evaluated. A 7% by weight aqueous solution of sucrose was employed as standard, i.e., regarded as 0 (see Table 3).

TABLE 2

Evaluation of Sweetness-Qualities of Single Sweetener (the Mean of 11 Panelists)

| | Evaluation Item | | 1 Sucrose | 2 Erythritol | 3 Aspartame | 4 Stevioside AXP | 5 Stevioside α-G P |
|---|---|---|---|---|---|---|---|
| ① | Smack; nonsmack; | + − | 0 | 0.45 | 1.09 | 1.36 | −0.27 |
| ② | Plain; Heavy; | + − | 0 | 0.09 | −1.18 | −0.50* | 1.45 |
| ③ | Odorous; Odorless; | + − | 0 | −0.09 | 0.18 | 0.18 | 0.09 |
| ④ | Bitter; Nonbitter; | + − | 0 | 0.73 | 1.45 | 1.64 | −0.09 |
| ⑤ | Aftertaste; No aftertaste; | + − | 0 | 0.36 | 1.36 | 1.18 | −0.09 |
| ⑥ | Astrigency; Nonastrigency; | + − | 0 | 0.45 | 1.27 | 0.82 | 0.09 |
| ⑦ | Unpalatability; Palatability; | + − | 0 | 1.18 | 0.73 | 1.27 | 1.45 |
| ⑧ | Undesirable; Desirable; | + − | 0 | 1.18 | 1.40* | 1.64 | 0.81 |

*Ten panelists out of eleven.
Criterion:
extremely: ±3
considerably: ±2
fairly: ±1 and
moderate: 0.

TABLE 3-(1):

Evaluation of Sweetness-Qualities of a Combination of Erythritol and Other Nonsugar Sweetener (the Mean of 10 Panelists)

| | Evaluation Item | | 1 Sucrose | 6-(1) (A) 4.0% (B) 0.033% | 6-(2) (A) 5.4% (B) 0.022% | 6-(3) (A) 6.7% (B) 0.016% |
|---|---|---|---|---|---|---|
| | | | | Mixture of Erythritol (A)/ Aspartame (B) | | |
| ① | Smack; nonsmack; | + − | 0 | 0.40 | −0.20 | 0.40 |
| ② | Plain; Heavy; | + − | 0 | −0.40 | 0.60 | −0.10 |
| ③ | Odorous; Odorless; | + − | 0 | −0.20 | −0.10 | −0.20 |

TABLE 3-(1):-continued

Evaluation of Sweetness-Qualities of a
Combination of Erythritol and Other
Nonsugar Sweetener (the Mean of 10 Panelists)

| | | | | Sweetener Sample No: | | |
|---|---|---|---|---|---|---|
| | | | | 6-(1) | 6-(2) | 6-(3) |
| | | | | Mixture of Erythritol (A)/ Aspartame (B) | | |
| | Evaluation Item | | 1 Sucrose | (A) 4.0% (B) 0.033% | (A) 5.4% (B) 0.022% | (A) 6.7% (B) 0.016% |
| ④ | Bitter: Nonbitter; | + − | 0 | 0.20 | 0.30 | 0.10 |
| ⑤ | Aftertaste; No aftertaste; | + − | 0 | 0.70 | 0.40 | 0.60 |
| ⑥ | Astrigency; Nonastrigency; | + − | 0 | 0.20 | 0.10 | 0.30 |
| ⑦ | Unpalatability; Palatability; | + − | 0 | 0.10 | 0.50 | 0.40 |
| ⑧ | Undesirable; Desirable; | + − | 0 | 0.20 | 0.50 | 0.70 |

Criterion:
extremely: ±3
considerably: ±2
fairly: ±1
moderate: ±0

TABLE 3-(2):

Evaluation of Sweetness-Qualities of a
Combination of Erythritol and Other
Nonsugar Sweetener (the Mean of 10 Panelists)

| | | | | Sweetener Sample No: | | |
|---|---|---|---|---|---|---|
| | | | | 7-(1) | 7-(2) | 7-(3) |
| | | | | Mixture of Erythritol (A)/ Stevioside AXP (C) | | |
| | Evaluation Item | | 1 Sucrose | (A) 4.0% (C) 0.027% | (A) 5.4% (C) 0.020% | (A) 6.7% (C) 0.014% |
| ① | Smack; nonsmack; | + − | 0 | 0.80 | 0.50 | −0.30 |
| ② | Plain; Heavy; | + − | 0 | 0.30 | 0.80 | 0.80 |
| ③ | Odorous; Odorless; | + − | 0 | 0.30 | 1.00 | 1.00 |
| ④ | Bitter: Nonbitter; | + − | 0 | 1.00 | 0.90 | 0.50 |
| ⑤ | Aftertaste; No aftertaste; | + − | 0 | 1.00 | 0.70 | 0.50 |
| ⑥ | Astrigency; Nonastrigency; | + − | 0 | 0.90 | 0.70 | 0.50 |
| ⑦ | Unpalatability; Palatability; | + − | 0 | 0.90 | 0.90 | 0.90 |
| ⑧ | Undesirable; Desirable; | + − | 0 | 1.30 | 1.20 | 0.80 |

Criterion:
extremely: ±3
considerably: ±2
fairly: ±1
moderate: 0

TABLE 3-(3):

Evaluation of Sweetness-Qualities of a
Combination of Erythritol and Other
Nonsugar Sweetener (the Mean of 10 Panelists)

| | | | | Sweetener Sample No: | | |
|---|---|---|---|---|---|---|
| | | | | 8-(1) | 8-(2) | 8-(3) |
| | | | | Mixture of Erythritol (A)/ Stevioside α-G P (D) | | |
| | Evaluation Item | | 1 Sucrose | (A) 4.0% (D) 0.04% | (A) 5.4% (D) 0.03% | (A) 6.7% (D) 0.02% |
| ① | Smack; nonsmack; | + − | 0 | 0 | 0.30 | −0.70 |
| ② | Plain; Heavy; | + − | 0 | 1.20 | 0.90 | 1.40 |
| ③ | Odorous; Odorless; | + − | 0 | 0.20 | 0.10 | 0 |
| ④ | Bitter: Nonbitter; | + − | 0 | 0.30 | 0.30 | −0.30 |
| ⑤ | Aftertaste; | + | 0 | 0.40 | 0.40 | −0.30 |

TABLE 3-(3):-continued

Evaluation of Sweetness-Qualities of a
Combination of Erythritol and Other
Nonsugar Sweetener (the Mean of 10 Panelists)

| | Evaluation Item | | 1 Sucrose | Sweetener Sample No: 8-(1) (A) 4.0% (D) 0.04% | 8-(2) Mixture of Erythritol (A)/ Steovioside α-G P (D) (A) 5.4% (D) 0.03% | 8-(3) (A) 6.7% (D) 0.02% |
|---|---|---|---|---|---|---|
| ⑥ | No aftertaste; Astrigency; Nonastrigency; | − + − | 0 | 0.40 | 0.20 | −0.20 |
| ⑦ | Unpalatability; Palatability; | + − | 0 | 0.70 | 1.00 | 0.90 |
| ⑧ | Undesirable; Desirable; | + − | 0 | 0.80 | 0.80 | 0.70 |

Criterion:
extremely: ±3
considerably: ±2
fairly: ±1
moderate: 0

(iv) FIGS. 1 to 5 are prepared based on the results of the organoleptic evaluation as shown in Tables 2 and 3.

Figure 2:
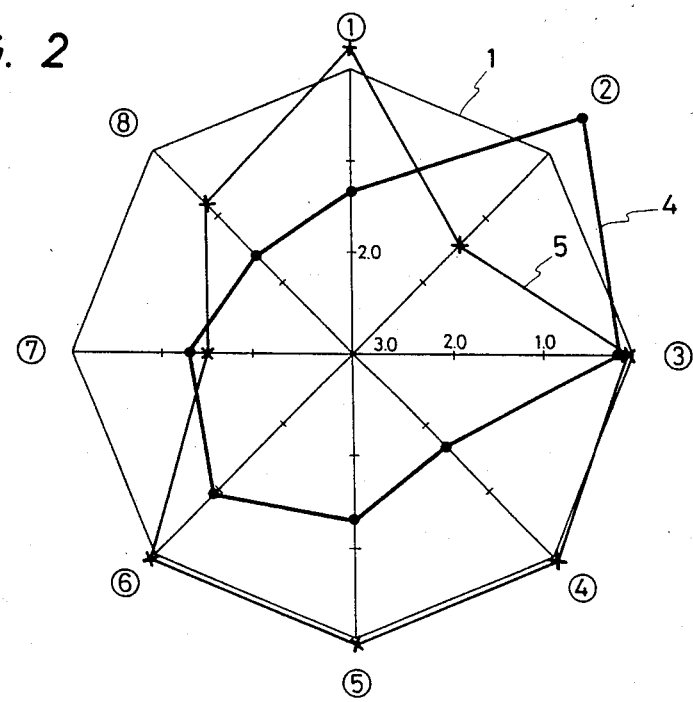

FIGS. 1 and 2 show the results of the evaluation of the sweetness-qualities of sucrose, mesoerythritol, aspartame, steviosideAXP and stevioside α-G Ⓟ each employed alone. In FIG. 1, 2 represents erythritol while 3 represents aspartame. In FIG. 2, 4 represents stevioside AXP while 5 represents stevioside α-G Ⓟ.

Figure 3:
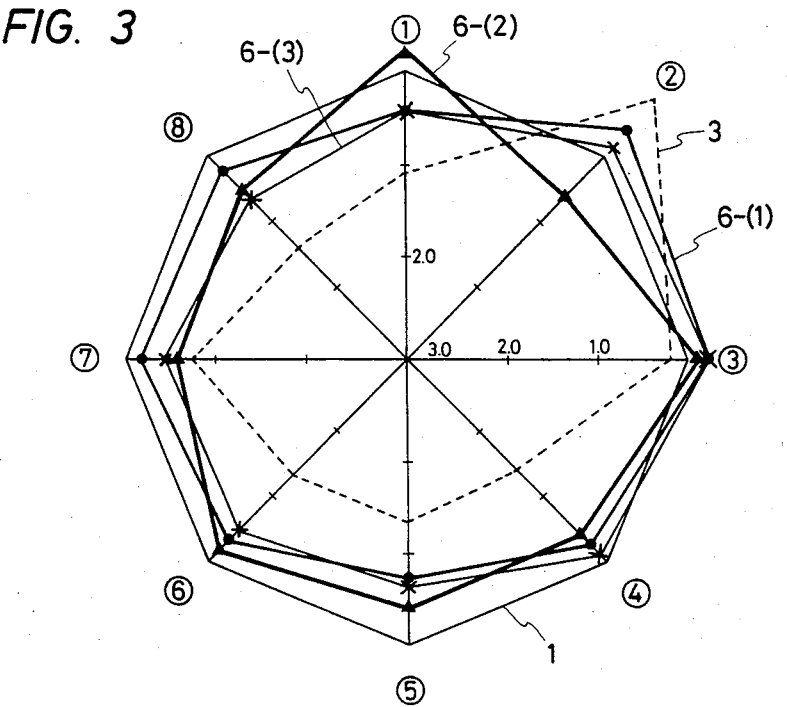
Figure 4:
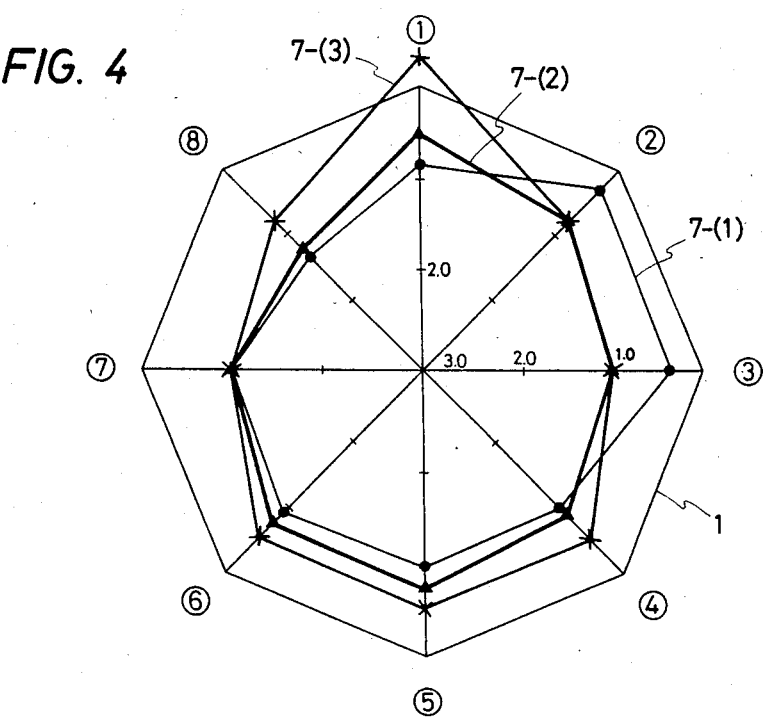
Figure 5:
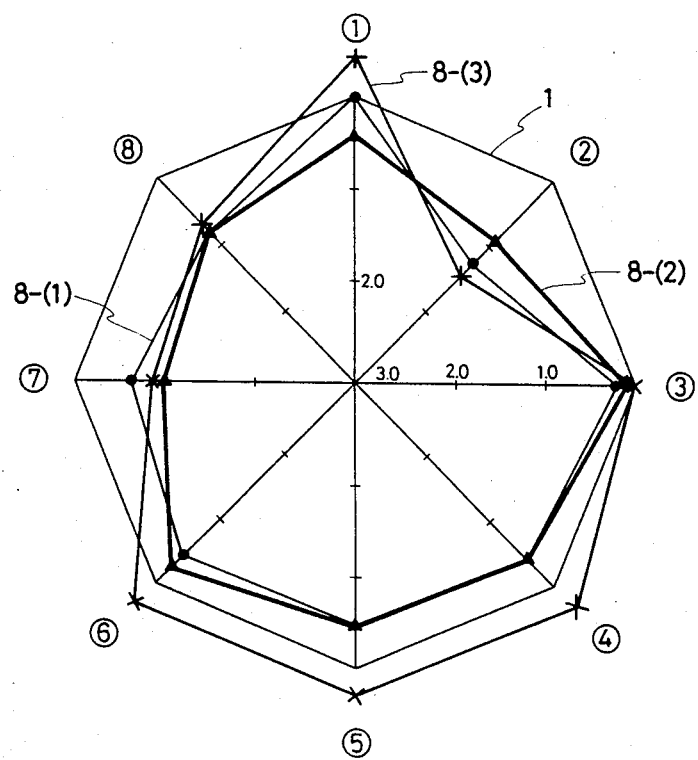

FIGS. 3 to 5 show the results of the evaluation of the sweentess-qualities of the mixtures of erythritol with other sweeteners as shown in Table 3. FIG. 3 shows the combination of mesoerythritol and aspartame, FIG. 4 shows that of mesoerythritol and stevioside AXP and FIG. 5 shows that of mesoerythritol and stevioside α-G Ⓟ. In these FIGS., 1 to 8 and 6-(1) to 8-(3) respectively correspond to the test items and sample numbers as shown in Table 3. In FIGS. 1 to 5, 1 represents sucrose.

(v) Evaluation

FIGS. 1 and 2 suggest that every sweetener used alone shows an unbalanced figure compared with that of sucrose. Namely, the sweetness-qualities of these sweeteners are different from those of sucrose.

In contrast thereto, FIGS. 3 to 5 obviously suggest that the compositions comprising mesoerythritol and various nonsugar sweeteners according to the present invention are closely similar to sucrose in the sweetness-qualities, compared with every single sweetener.

While the invention has been described in detail and with reference to specific embodiment thereof, it will be apparent to one skilled in the art that various changes and modifications can be made therein without departing from the spirit and scope thereof.

What is claimed is:

1. A sweetener composition comprising one part by weight of mesoerythritol, and at least one non-sugar sweetener selected from the group consisting of 0.0006 to 0.004 parts by weight of stevioside, or 0.001 to 0.014 parts by weight of aspartame.

2. The composition of claim 1, wherein a content in grams of said sweetener per gram of mesoerythritol times a sweetness thereof is 0.12 to 1.65 when said sweetness is 100 to 200 and is 0.10 to 0.24 when said sweetness is 201 to 500.

3. The composition of claim 2 wherein said sweetness is 100 to 200 and said sweetener is aspartame.

4. The composition of claim 2 wherein said sweetness is 201 to 500 and said sweetener is stevioside.

5. A composition of claim 1 comprising mesoerythritol and stevioside in a weight ratio of 1:0.0006 to 1:0.0024.

6. The composition of claim 1 comprising mesoerythritol and aspartame in a weight ratio of 1:0.002 to 1:0.008.

* * * * *